J. DE G. THOMPSON.
INSTRUCTION BOOK.
APPLICATION FILED MAY 2, 1908.
909,477.
Patented Jan. 12, 1909.
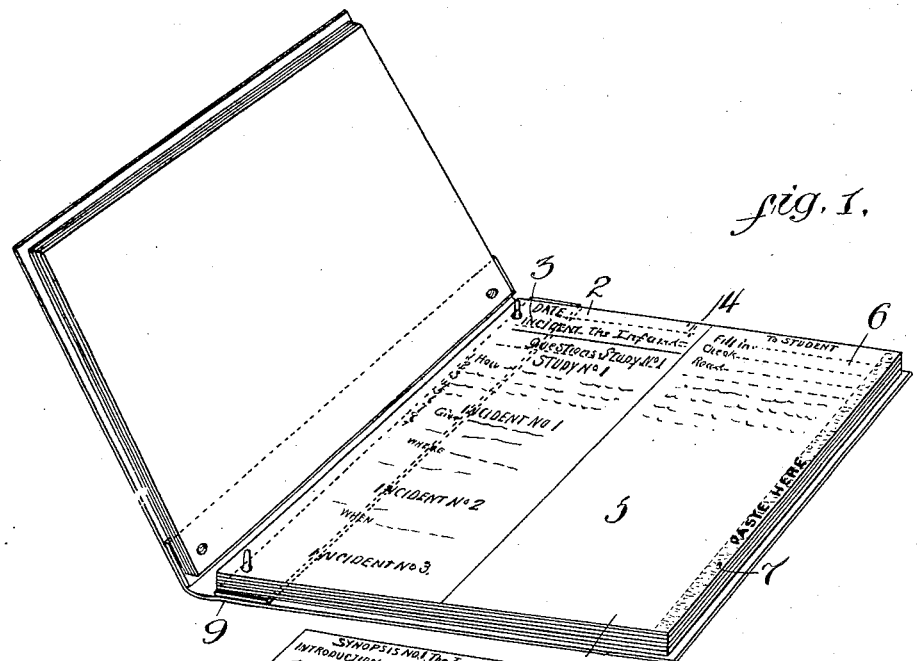
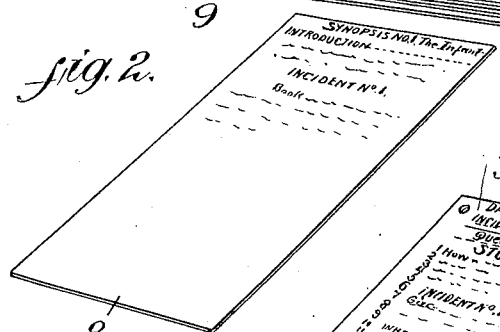
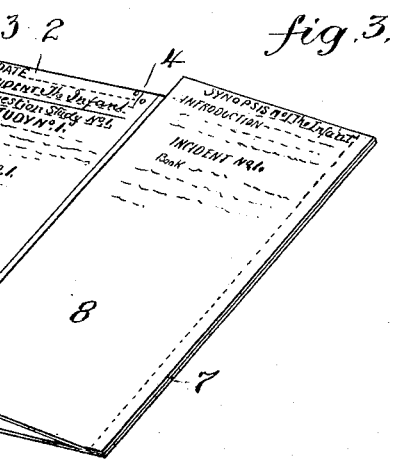
Witnesses:
C. H. Benjamin
Marie F. Wainright
Inventor
Jane De G. Thompson.
By her Attorney
T. F. Bourne

UNITED STATES PATENT OFFICE.

JANE DE G. THOMPSON, OF DOBBS FERRY, NEW YORK.

INSTRUCTION-BOOK.

No. 909,477.  Specification of Letters Patent.  Patented Jan. 12, 1909.

Application filed May 2, 1908. Serial No. 430,453.

*To all whom it may concern:*

Be it known that I, JANE DE G. THOMPSON, a citizen of the United States, and resident of Dobbs Ferry, in the county of Westchester and State of New York, have invented certain new and useful Improvements in Instruction-Books, of which the following is a specification.

The object of my invention is to provide means to facilitate the instruction of students in the desired subjects, and in carrying out my invention I provide sheets for a book with questions for students produced on one side of the sheet, and a space in line therewith on the opposite sides of the sheet, wherein the student writes in the answers to the questions, with directions to the student upon the sheet, and means for applying to the sheet a synopsis regarding the subject of the questions, or answers to the questions, which will, when permanently attached to the sheet, overlie the answers written by the student upon the sheet. By this means printed questions may be handed to a student, who will write the best answers he can adjacent the questions and hand the sheet back to the teacher, who will check up the answers and note the appropriate credit mark on the sheet, and then the teacher will hand to the student a sheet having the correct synopsis or answers printed upon it, and the student will attach such sheet along the edge of the main sheet overlying the answers previously given, in such manner that the synopsis or correct answer sheet may be lifted away from over the written answers, as desired, to inspect the latter, and to compare them with the synopsis or printed answers, to ascertain the correctness and deficiencies in the student's answers.

In the accompanying drawings I have illustrated in a book or binder the sheets embodying my invention, wherein—

Figure 1 is a perspective view of the book of instructions sheet showing the synopsis or answer sheet not attached; Fig. 2 is a perspective view of the synopsis or answer sheet, and Fig. 3 is a perspective view of the question and answer sheet with the synopsis sheet attached thereto.

Upon one side of a sheet 1 is produced, preferably by printing or the like, a series of questions, preferably numbered in consecutive order, which may be arranged in suitable relation in accordance with the subject under consideration. I have shown the sheet provided with the words Study No. 1, underneath which are produced the questions, and within the series of questions are subheadings, such as Incident No. 1, Incident No. 2, etc. Above the questions is a line 2 for the date, and the subject of the study, shown at 3, and a percentage mark, indicated at 4, may also be produced upon the sheet. Upon the opposite side of the sheet is a space, indicated at 5, in line with the questions, which space may be ruled if desired, in which space the student writes the answers to the respective questions opposite each question.

On the same side of the sheet, and preferably above the answer space 5, are directions to the student, as at 6. Along a margin 7 of sheet 1 is a space adapted to receive paste, with directions regarding the same, to which the corresponding edge of a synopsis or answer sheet 8 is to be pasted to lie over the student's answer space 5. The synopsis or answer sheet 8 is shown of substantially the same width as the student's answer space 5, so that when pasted upon sheet 1, as indicated in Fig. 3, the sheet 8 may overlie the student's answers but not overlie the questions. The sheet 8 may have printed upon it a synopsis of the study for the incidents in proper order with respect to the same upon the question side of sheet 1, or sheet 8 may have the correct answers printed thereon to aline with the numbered questions.

The sheets 1 will preferably be bound in a loose leaf binder 9 of any suitable construction, so that the sheets as given to the student by the teacher may be attached in order of receipt in the binder.

In using my improvements the teacher will hand to the student a sheet 1, and the student will write the answers to the questions upon space 5 opposite the respective questions and return the sheet to the teacher. After the teacher has examined the answers she will, if desired, place the credit mark adjacent the percentage indication 4, the date of giving out or receiving back the sheet being written upon the same, and the teacher will then hand to the student a sheet 8 bearing a synopsis of the subject or an answer sheet. After a synopsis sheet has been given the student the latter will, by the aid of such synopsis, correct the answers previously given by writing such corrections upon space 5 of sheet 1, but if an answer sheet is given the student may compare his answers with such printed answers, and fill in the correct answer where necessary, if desired. In either case the student will paste sheet 8 upon sheet 1 in such position that sheet 8 will overlie the student's answers and yet may be lifted from said answers at any time for comparison. The sheet as finished will always show to the student his correctness or deficiencies in any subject of his study and may become a permanent record.

A teaching system established by means of my improvements will be of aid to the teacher, as well as to the student, and may be carried on by mail or otherwise. The completed sheets as bound in the binder or otherwise become a permanent record of the various subjects which will be of advantage to the student for reference.

Having now described my invention what I claim is:

1. A study sheet divided into two spaces, one having questions printed thereon, the other having printed directions and an adjacent unprinted portion, the second named space having a printed information sheet of substantially the same dimensions as the second named space, pasted at one margin to one margin of the first named sheet, overlying the unprinted portion and free to be lifted.

2. A study sheet divided into two spaces, one having questions printed thereon, the other having printed directions and written answers, the second named space having a printed information sheet of the same dimensions as the second named space pasted at one margin to one margin of the first named sheet, overlying the written answers and free to be lifted for inspection of them.

Signed at New York city, in the county of New York, and State of New York, this 1st day of May, A. D. 1908.

JANE DE G. THOMPSON.

Witnesses:
T. F. BOURNE,
MARIE F. WAINWRIGHT.